United States Patent
Daly et al.

(10) Patent No.: US 9,092,773 B2
(45) Date of Patent: Jul. 28, 2015

(54) GENERATING AND CATEGORIZING TRANSACTION RECORDS

(75) Inventors: Brian Kevin Daly, Seattle, WA (US); Qingmin Hu, Sammamish, WA (US); Karen Mullis, Loganville, GA (US); Jamie Toren, Atlanta, GA (US); Mark Edward Causey, Tucker, GA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 231 days.

(21) Appl. No.: 13/539,338

(22) Filed: Jun. 30, 2012

(65) Prior Publication Data

US 2014/0006198 A1   Jan. 2, 2014

(51) Int. Cl.
| | |
|---|---|
| *G11B 19/00* | (2006.01) |
| *G06Q 20/32* | (2012.01) |
| *H04M 11/10* | (2006.01) |
| *G06Q 30/06* | (2012.01) |
| *G06Q 20/34* | (2012.01) |
| *G06Q 20/26* | (2012.01) |
| *G06Q 20/20* | (2012.01) |

(52) U.S. Cl.
CPC .......... *G06Q 20/3278* (2013.01); *G06Q 20/209* (2013.01); *G06Q 20/26* (2013.01); *G06Q 20/34* (2013.01); *G06Q 30/06* (2013.01); *H04M 11/10* (2013.01)

(58) Field of Classification Search
CPC ............................ G06Q 20/20; H04M 11/10
USPC ......... 705/16, 24, 30, 39; 707/737; 369/26.01
See application file for complete search history.

(56) References Cited

U.S. PATENT DOCUMENTS

| | | |
|---|---|---|
| 7,780,081 B1 | 8/2010 | Liang |
| 7,783,515 B1 | 8/2010 | Kumar |
| 7,792,709 B1 | 9/2010 | Trandal |
| 7,966,329 B1 | 6/2011 | Rukonic |
| 8,055,535 B2 | 11/2011 | Lavoie |
| 8,060,423 B1 | 11/2011 | Rukonic |
| 8,073,759 B1 | 12/2011 | Del Favero |
| 8,447,666 B1* | 5/2013 | Keld .............................. 705/39 |
| 2003/0144793 A1 | 7/2003 | Melaku |
| 2004/0181463 A1 | 9/2004 | Goldthwaite |

(Continued)

OTHER PUBLICATIONS

Sharlyn Lauby, 7 Handy iPhone Apps for Creating Expense Reports, Mashable Business, Dec. 30, 2012, http://mashable.com/2010/12/30/expense-reports-iphone-apps/.

(Continued)

*Primary Examiner* — Hunter Wilder
(74) *Attorney, Agent, or Firm* — Hartman & Citrin LLC

(57) ABSTRACT

Devices, systems, and methods are disclosed for tracking financial transactions at their source, generating transaction records, categorizing and storing the records, and providing services related to the records. Transactions performed between a mobile device and a point-of-sale may automatically generate transaction records including electronic receipts that may be categorized and stored on a database. More traditional transactions such as those involving cash, paper receipts, etc. may be captured via a scanner on the mobile device for inclusion within a transaction record and subsequent categorization and storage. Notifications such as alerts, offers, and recommendations may be provided in real-time or close-in-time to the transaction being performed, thereby enabling services such as budgeting, inventory management, rewards, offers, etc.

20 Claims, 8 Drawing Sheets

(56) References Cited

U.S. PATENT DOCUMENTS

| | | | |
|---|---|---|---|
| 2008/0086414 A1* | 4/2008 | Ching | 705/39 |
| 2008/0133386 A1 | 6/2008 | Darvish | |
| 2009/0254476 A1* | 10/2009 | Sharma et al. | 705/39 |
| 2010/0228659 A1 | 9/2010 | Pandipati | |
| 2010/0257066 A1* | 10/2010 | Jones et al. | 705/30 |
| 2012/0036018 A1 | 2/2012 | Feliciano | |
| 2012/0239564 A1* | 9/2012 | Summerrow et al. | 705/41 |

OTHER PUBLICATIONS

Westat, Data Capture Technologies and Financial Software for Collecting Consumer Expenditure Data, Mar. 11, 2011, http://www.bls.gov/cex/ceother2011westat.pdf.

Robert Strohmeyer, Expensify Adds Receipt Scanning to Simplify Expense Reporting, PCWORLD, May 20, 2011, http://www.pcworld.com/printable/article/id,228342/printable.html.

\* cited by examiner

GENERATING AND CATEGORIZING TRANSACTION RECORDS

BACKGROUND OF THE SUBJECT DISCLOSURE

1. Field of the Subject Disclosure

The subject disclosure relates to generating and categorizing transaction records. More specifically, the subject disclosure relates to generating a transaction record of a commercial transaction conducted by a user, transmitting the transaction record to a server, and categorizing the transaction record for subsequently providing related services to the user.

2. Background of the Subject Disclosure

Personal finance is a painstaking endeavor for almost anyone except professional accountants. A tremendous amount of energy and resources are dedicated towards tracking financial transactions, including expenses such as purchases, etc., for reasons such as budget management. Tracking expenses may be performed by saving physical receipts generated at a point-of-sale, then manually compiling the information from the physical receipts. However, amassing large numbers of physical receipts and processing them at specific intervals (monthly, etc.) is an inefficient process. Even as the information age progresses and increasing numbers of users perform financial transactions electronically, there is still no convenient mechanism for managing such transactions. Moreover, there are limited means presently available for seamlessly sharing transaction information, whether historical or in real-time, with other entities such as friends, service-providers like accountants, merchants, etc.

SUMMARY OF THE SUBJECT DISCLOSURE

In one example embodiment, the subject disclosure may include a server on a network, the server including a memory, a processor, and a logic stored on the memory, the logic including computer-readable instructions that when executed by the processor cause the processor to perform operations including receiving a transaction record from at least one of a mobile device associated with a user and a point-of-sale (POS) terminal, the transaction record being generated as a result of a transaction involving at least the POS terminal, the transaction record including a plurality of attributes, and determining a category for the transaction record based in part on the plurality of attributes. The transaction record may be stored in the determined category within a profile associated with the user.

In another example embodiment, the subject disclosure may include a non-transitory computer-readable medium having a computer program product stored thereon, the computer program product comprising instructions that, when executed by a processor, cause the processor to perform operations including receiving a transaction record from at least one of a mobile device associated with a user and a point-of-sale (POS) terminal involved in a transaction associated with the transaction record, the transaction record including a plurality of attributes, and determining a category for the transaction record based in part on the plurality of attributes.

In yet another example embodiment, the subject disclosure may include a non-transitory computer-readable medium on, for instance, a mobile device, the medium having a computer program product stored thereon, the computer program product comprising instructions that, when executed by a processor, cause the processor to perform operations including generating a transaction record upon detecting a purchase, appending a plurality of attributes to the transaction record, and transmitting the transaction record to a server, wherein the transaction record is assigned to a category based upon the plurality of attributes, and wherein the transaction record includes a receipt image.

DETAILED DESCRIPTION OF THE SUBJECT DISCLOSURE

Figure 1:
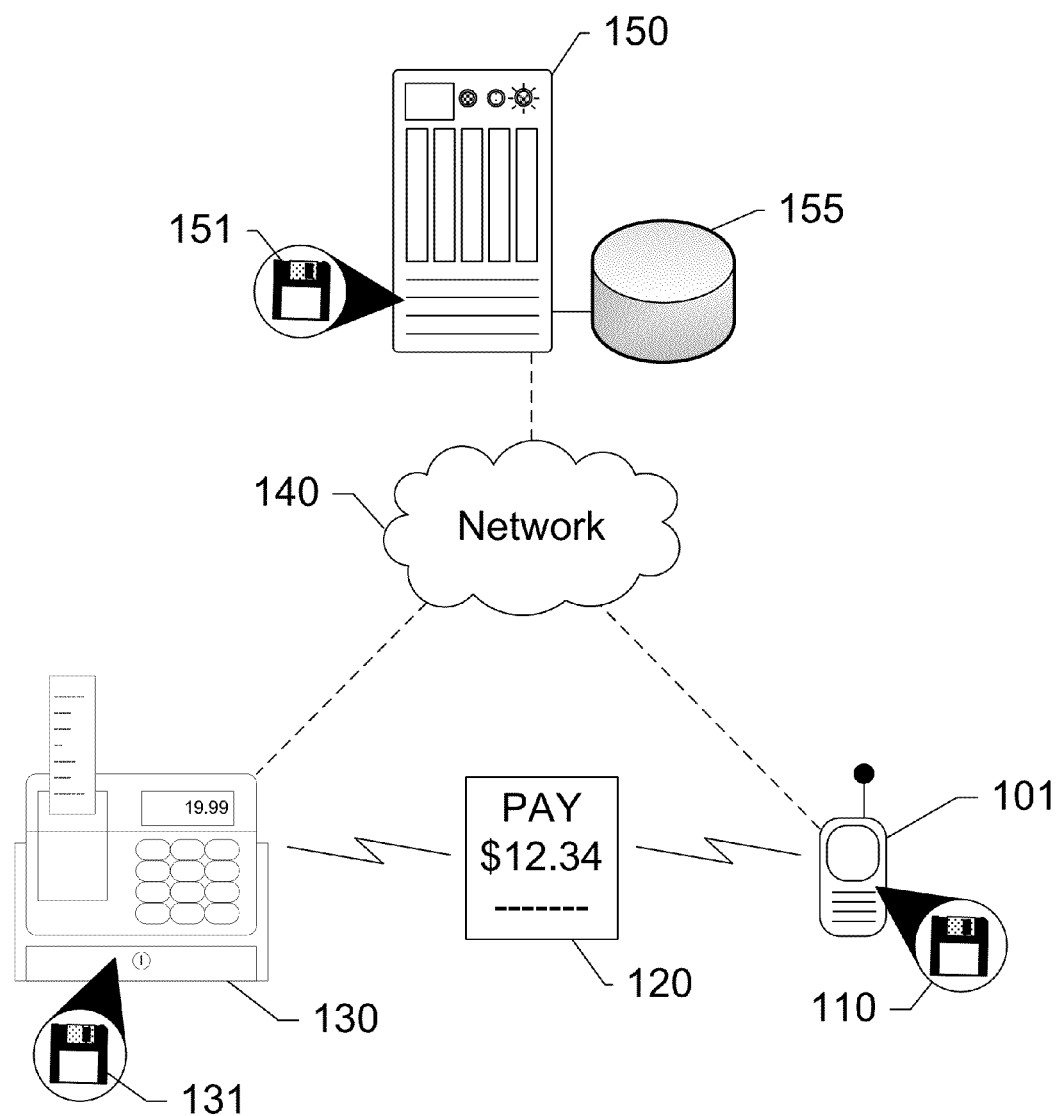
FIG. 1 shows a system for generating and categorizing transaction records, according to an example embodiment of the subject disclosure.

The subject disclosure presents devices, systems, and methods for tracking financial transactions at their source, generating transaction records, categorizing and storing the records, and providing services related to the records. A transaction may be performed between a buyer and a seller, for instance, a consumer and a merchant. The transaction may be performed electronically between a mobile device associated with the user, and a point-of-sale (POS) terminal associated with the merchant. The transaction may be enabled by, for instance, near-field communication (NFC) technology controlled by applications on the mobile device such as a mobile wallet, mobile payment, etc. Such a transaction may generate an electronic transaction record associated with the transaction. The record may include at least a receipt of sale, and may be categorized and stored on a database.

Other transactions may involve more traditional payment methods such as cash, credit card, or debit card, where the POS terminal may generate a paper receipt along with a consumer copy. The consumer or user of the mobile device may capture the contents of the paper receipt by using a scanner coupled to the mobile device, such as a camera. The image may be parsed via optical-character recognition (OCR) or other means, and the extracted information may be used to populate a transaction record generated by logic on the mobile device. For instance, an amount and a merchant name may be extracted, enabling subsequent categorization of the transaction record. Other information such as a date, time, location, etc. may be extracted from or appended to the transaction record before the transaction record is categorized and stored. Transaction records may also be transmitted from the POS terminal to the mobile device or to the network via e-mail or other messaging system. Personal account information linked to traditional payment methods, such as credit card, debit card, or checks, may be used by the POS terminal to determine where to send the transaction record directly.

The categorization and storage may occur at the mobile device, on a network database (often referred to as a database on the "cloud"), combinations thereof, etc. Cloud databases may store large amounts of information that may encompass more than receipt tracking. For instance, the transaction records may be stored within a user's budget that is within just one layer of such a cloud database, with portions of stored content being accessible by or disseminated to diverse entities. The budget may be stored within a privacy layer of the database, with a permission/trust level or key associated with the layer. Users themselves may, by default, be granted full access to their transactions, monitor their expenses, observe trends in different categories, and define rules prescribing limits or thresholds for activity in specific categories and combinations of categories. Requesting entities may be provided access to particular portions of the information depending on their identity and their associated trust level as defined by the user. A budgeting system or application may access the transaction records to determine trends, retrieve limits/thresholds, generate recommendations, and provide notifications to the user. An inventory management system may retrieve transaction records to determine purchases and quantities for maintaining and updating an inventory of items owned and purchased by the user. Third parties, such as merchants, marketers, advertisers, etc., may retrieve the transaction records to observe trends in a user's purchasing habits to derive preferences, and may transmit advertisements or offers to the user. Notifications such as alerts, offers, and recommendations may be provided in real-time or close-in-time to the transaction being performed, thereby enabling services such as budgeting, inventory management, rewards, offers, etc.

There are many different ways to embody the subject disclosure. For simplicity, the following example embodiments present, for the most part, a minimal amount of structure necessary to achieve the functions of the subject disclosure. In many of the following example embodiments, one device, network, terminal, memory, logic, etc. is shown where a plurality may be used in tandem to achieve the same function. Those having skill in the art will recognize these pluralities, which are within the scope of the subject disclosure.

FIG. 1 shows a system for generating and categorizing transaction records, according to an example embodiment of the subject disclosure. A user operating a mobile device 101 may participate in a transaction with a point of sale (POS) terminal 130, resulting in a transaction record, such as a receipt 120. Logic 110 on mobile device 101 may include a mobile wallet or mobile payment application to enable a fluid transaction through communication with POS terminal 130, which may include logic 131 for generating and transmitting receipt 120 to mobile device 101. Further, both mobile device 101 and POS terminal 130 may communicate with server 150 across network 140. Server 150 may include logic 151 for providing services to the user of mobile device 101, including receiving, categorizing, and storing transaction records received from either mobile device 101 or POS terminal 130. Consequently, logic 110 and logic 131 may be enabled to generate transaction records and transmit them to server 150 across network 140. For instance, logic 110 on mobile device 101 may present the user with an alert that a receipt 120 has been received from POS terminal 130. Logic 110 may provide an interface for viewing the receipt, adding details such as category, etc., and saving the resulting transaction record locally or transmitting to server 150 to be processed. Such an interface (and related method) is described in more detail with respect to FIGS. 4 and 5.

Server 150 may be owned by one or more of a plurality of entities, including the user of mobile device 101, a company for tracking expenses associated with the user, a merchant or other owner of POS terminal 130, a service provider, a network operator, etc. Described herein are several embodiments including some of the various possible configurations. In either case, logic 151 on server 150 may include at least an ability to receive transaction records, such as receipt 120, and to determine at least one category for the transaction record. The category may be determined based on a plurality of attributes of the transaction record. For instance, a category may include a type of item or service purchased, with the determination being based on an identifier of a merchant or vendor operator of POS terminal 130. Said identifier may have been stored beforehand, in that logic 151 may refer to previously stored identifiers to identify a merchant, and therefore, may have the information to determine a transaction category. Such a category may also be determined by extracting an item description or other information from the transaction record, such as attributes added to the transaction record by logic 110, logic 131, or manually by a user of mobile device 101. These attributes may include, among other attributes, a date and/or time of the transaction, a location, payment information (including which bank account or credit card was used), user-defined categories (leisure, travel, charity, etc.), etc.

Communication among any of mobile device 101, POS terminal 130, and network 140 may be accomplished via wired or wireless technology, such as WiFi, cellular, broadband, etc. Consequently, mobile device 101 and POS terminal 130 may include appropriate transceivers, such as network adapters, subscriber identity modules (SIM), or universal integrated circuit cards (UICC), etc. Further, devices 101 and 130 may have more than one transceiver, capable of communicating over different networks. For example, mobile device 101 may include a cellular transceiver for communicating with network 140, and one or both of a Wi-Fi transceiver and a BLUETOOTH® transceiver for communicating with POS terminal 130. Further, either of logic 110, 131, and 151 includes program instructions, such as software that, when executed by a processor, causes the processor to enable such communication. Logic may also be comprised by digital and/or analog hardware circuits, for example, hardware circuits comprising logical AND, OR, XOR, NAND, NOR, and other logical operations. Logic may be formed from combinations of software and hardware. On network 140, logic such as logic 151 may be programmed on a combination of servers and/or a complex of servers. A particular logic unit is not limited to a single logical location on the communication network. Further, network 140 may include multiple networks, such as broadband wide-area networks including cellular networks, the Internet, etc., as well as local-area networks (LAN), personal area networks, and any combination thereof. A network typically includes a plurality of elements that host logic for performing tasks on the network.

Figure 2:
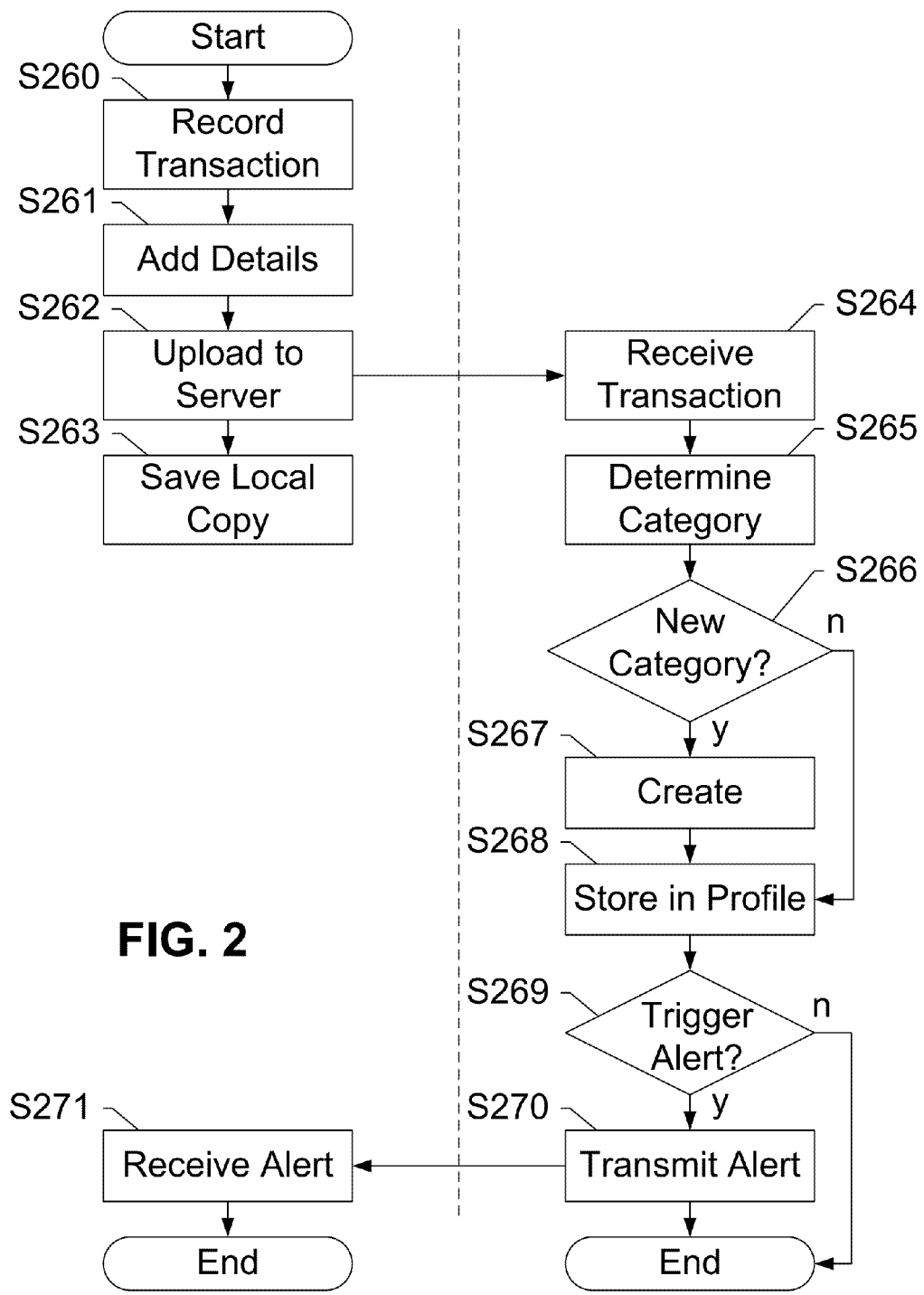
FIG. 2 shows a method for generating and categorizing transaction records, according to an example embodiment of the subject disclosure.

FIG. 2 shows a method for generating and categorizing transaction records, according to an example embodiment of the subject disclosure. A transaction may be performed between a buyer and a seller, for instance, a consumer and a merchant. The transaction may be performed electronically between a mobile device associated with the user, and a point-of-sale (POS) terminal associated with the merchant. The method is shown from the perspective of both the mobile device (left side) and the POS terminal (right side). The transaction may be facilitated through wireless communication between the mobile device and the POS terminal using, for instance, near-field communication (NFC) technology controlled by applications on the mobile device such as a mobile wallet application, a mobile payment application, etc. Such a transaction may generate an electronic transaction record associated with the transaction (S260). The transaction record may include at least the details of a receipt of sale. In the case of a mobile payment using NFC or any other wireless communication technology, the receipt may be generated by the POS terminal and transmitted to the mobile device wirelessly. In order to record transactions involving traditional forms of payment such as cash, credit cards, and debit cards, where the POS terminal typically generates a paper receipt along with a consumer copy, the contents of the paper receipt may be captured by using a scanner coupled to the mobile device, such as a camera. An image of the paper receipt may be parsed via optical-character recognition (OCR) or other means, and the extracted information may be used to populate a transaction record generated by logic on the mobile device. For instance, a price, a product, an amount of product, a merchant name, etc., may be extracted, enabling subsequent categorization of the transaction record. The extraction may involve parsing the image of the paper receipt and recognizing a string of characters from the image, and adding the recognized string of characters to the plurality of attributes. Strings of characters may be recognized based on a comparison of the strings with known receipt formats, by comparison with known merchant names, item names and descriptions, or any other currently known or future means for recognizing characters.

Other information, such as a date, time, location, etc., may be determined through other components or information sources and appended to the transaction record before the transaction record is categorized and stored (S261). For instance, a user interface on the mobile device may provide the user with the ability to add details to the transaction, such as a location, or other "tags," annotations, or attributes that may be useful in subsequently categorizing the transaction. The user may even be able to specify categories that the transaction may fall under, such as business, travel, etc., before submitting the transaction record to a server (S262). Location information may be determined by a GPS component of the mobile device, or through communication with a cellular base station transceiver, the resultant determination of either of which may be cross-referenced with a database on a network to provide a desired form of the location, such as department, store number, mall, city, state, country, etc. Such a user interface for adding details S261 and submitting records S262 is further described in the example embodiment of FIG. 4. A copy of the transaction record may be stored locally (S263). Such local storage, which may be permanent or temporary, may enable the user to review the most recent transactions without having to download transaction records from the server. The example embodiment of FIG. 2 shows an interaction between a mobile device and a server. However, operations S260-S263 may also be performed by execution of logic stored on a memory of a POS terminal, and the resulting transaction record may subsequently be uploaded to the mobile device via e-mail or other messaging system, as well as to a cloud database. Moreover, the transaction record may be uploaded to a user's home computer acting as the server, to a company server for tracking expenses, to a user profile stored on a database on the "cloud", any combinations thereof, etc. Additionally, the operations on the right side of FIG. 2 may be performed by either of these entities in any combination.

In any case, the transaction record may be received by the server (S264). Logic on the server may include instructions for monitoring such receipt of transaction records, and either storing them for later processing, or instantly processing the received transaction records. Such processing may include, for instance, determining an appropriate category for the transaction record (S265). Determination S265 may be based on one or more of several diverse factors, such as the contents of the received record, an amount, a merchant name, date, time, location, user-defined tags, annotations, attributes, etc. Determination S265 may also consider, conclusively or suggestively, user-specified categories that the transaction may fall under, such as business, travel, etc. Determination S265 may further be based on externally-sourced information such as past transactions performed by the current or other users, expert opinions retrieved from sources such as the internet, etc. If the determination results in a new category (S266), for instance by extracting a customer-defined category, then the new category may be created S267 and saved as a possible category for future transaction records, and in either case, the transaction record is stored in the appropriate category of the user's profile (S268). For instance, the transaction record may be stored within one of a plurality of categories within a user's budget on a layer of a multi-layer cloud database, with each layer and/or category being associated with a permission level. Besides the user himself, who may enjoy unrestricted access, any other entity requesting access to the user's cloud database may be provided access to limited portions of the information depending on their identity and their associated trust level as defined by the user.

A determination may be made whether or not to alert the user (S269) once the transaction record has been stored on the server. The alert may be triggered in several different ways. For instance, users themselves may define rules prescribing limits or thresholds for activity in specific categories and combinations of categories. Upon determining that one of these thresholds is approaching or has been exceeded with the arrival of the newly received transaction record, an alert may be generated and transmitted to the user (S270). Alerts may include notifications, recommendations, etc., from several applications. For instance, a budgeting system or application may access the transaction records to determine trends, retrieve limits or thresholds, generate recommendations, and provide notifications to the user. An inventory management system using transaction records for maintaining and updating an inventory of items owned and/or purchased by the user may transmit a low-quantity alert or a purchase recommendation. Third parties, such as merchants, may observe trends in a user's purchasing habits to determine preferences, and may transmit advertisements or offers to the user. Notifications such as alerts, offers, and recommendations may be provided in real-time or close-in-time to the transaction being performed, thereby enabling these diverse services. The alert may be received at the user's mobile device, displayed for the user by the mobile device, and acted upon by the user (S271). For instance, the user may store the alert, deny an offer included in the alert, or act upon the alert by electing to purchase an offered item, modify their budget, etc.

Figure 3A:
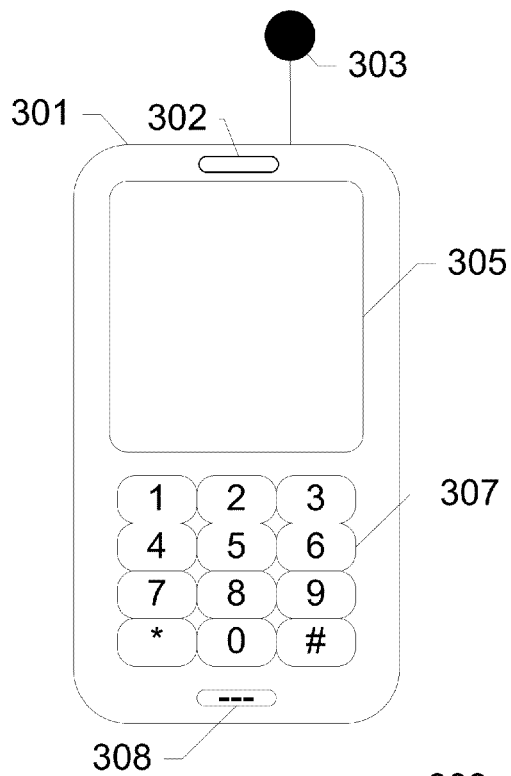
FIGS. 3A and 3B show components of a mobile device for generating and categorizing transaction records, according to an example embodiment of the subject disclosure.
Figure 3B:
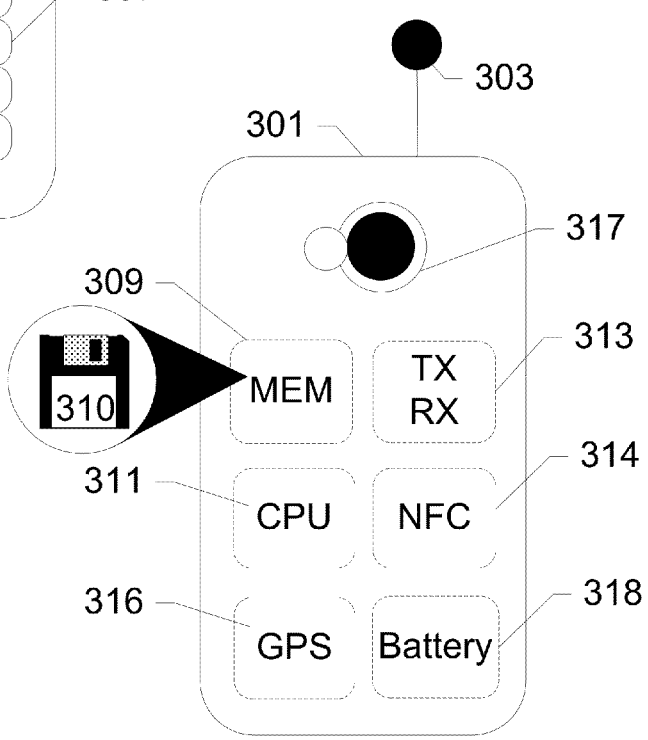

FIGS. 3A and 3B show components of a mobile device for generating and categorizing transaction records, according to an example embodiment of the subject disclosure. Mobile device 301 may include a speaker 302, a display 305, an input 307, a microphone 308, and an antenna 303. Display 305 may be used as visual output for mobile device 301, and may be any of the currently known or later developed display technologies including Light Emitting Display (LED), Liquid Crystal Display (LCD), Electroluminescent Display (ELD), Organic Light Emitting Diode (OLED), Carbon nanotubes, nanocrystal displays, etc. For example, display 305 may show a phone number being entered by a user, a user interface for receiving and submitting a transaction record, receiving alerts, etc. Input 307 may be, for example, a keypad used for entering numbers, querying a home inventory system, or carrying out assigned functions. Mobile device 301 may further include a microphone 308 and a speaker 302, through which voice communication with users of other mobile devices, interactive voice response (IVR) systems, etc. is possible. Microphone 308 may be used for oral input, and may be utilized for voice-activated functionalities of mobile device 301. For example, the user may speak a category into microphone 308 before performing a transaction, enabling automatic categorization of the transaction before submitting. Microphone 308 and speaker 302 may utilize any currently known or later developed technologies including microphones and speakers currently being employed in consumer mobile devices or any other suitable microphone and speaker. Antenna 303 may be a transducer for transmitting and receiving wireless radio frequency (RF) signals to and from wireless networks, network nodes, and other wireless communication devices including a wireless base transceiver station (BTS), WiFi access point, etc.

FIG. 3B shows the inner components of mobile device 301, according to an example embodiment of the subject disclosure. The inner components of mobile device 301 may include a memory 309 storing a consumer logic 310, a processor such as CPU 311, a transceiver 313, a near-field communication unit 314, a positioning system such as GPS 316, a camera 317, and a battery 318. Processor 311 may be used to execute various functions when instructed to do so by programs and other logic stored on memory 309 or any other data storage of mobile device 301 such as a smart card or a memory card slot (not shown). Processor 311 may incorporate any presently known or later developed technologies including computer processors (processing units), microprocessors, digital signal processors, controllers and microcontrollers, etc. Logic 310 stored on memory 309 may be executed by processor 311 enabling communication and interaction with a point-of-sale (POS) terminal, an application server over a network, etc., for instance, via a user interface or application. This interaction may include conducting transactions such as purchasing products, scanning receipts (via camera 317), generating transaction records, categorizing and storing records, and receiving alerts.

Furthermore, a transceiver 313 may be used to transmit and receive data and signals between processor 311 and antenna 303. Transceiver 313 may utilize any currently known or later developed technologies including Radio Frequency (RF) transceivers, Gigabit Interface Converter (GBIC), small form-factor pluggable transceiver (SFP), enhanced small form-factor pluggable (SFP+), etc. Many mobile devices may have more than one transceiver or a transceiver that supports more than one protocol, such as NFC unit 314, used in part to perform mobile payments. A single mobile device can support cellular radio frequency (RF), Global System for Mobile communications (GSM), General Packet Radio Service (GPRS), Universal Mobile Telecommunication System (UMTS), Wideband Code Division Multiple Access (W-CDMA), Long-Term Evolution (LTE), NFC, WiFi, BLUETOOTH®, ZIGBEE®, and Z-WAVE® protocols. A mobile device capable of multiple modes of wireless communication, such as cellular, WiFi, NFC, etc., may contain a plurality of antennas on a single device. For example, an NFC-enabled wireless communication device may have separate antennas for cellular and NFC communications.

GPS 316 may communicate with positioning satellites to determine a location of mobile device 301 anywhere in the world. GPS 316 may utilize any presently known or later developed positioning technology such as Global Positioning System (GPS), GALILEO, Global Navigatsionnaya Sputnikovaya Sistema (GLONASS), etc. Location information may also be determined through communication with terrestrial base stations using information provided by the terrestrial base stations and a calculation of the response time associated with the communication. Camera 317 may capture visual information helpful to the generation and categorization of transaction records, such as paper receipts, product images, bar codes, advertisements, coupons, etc. Battery 318 may be used to power mobile device 301 and components described herein. Battery 318 can be any of the presently known or later developed technologies used in mobile devices or used in powering communication components including Lithium-Ion batteries, lithium-polymer batteries, molten salt batteries, etc. Further, battery 318 may be charged via a power port (not shown), inductively, or via a power source coupled to a cover applied to mobile device 301.

Figure 4:
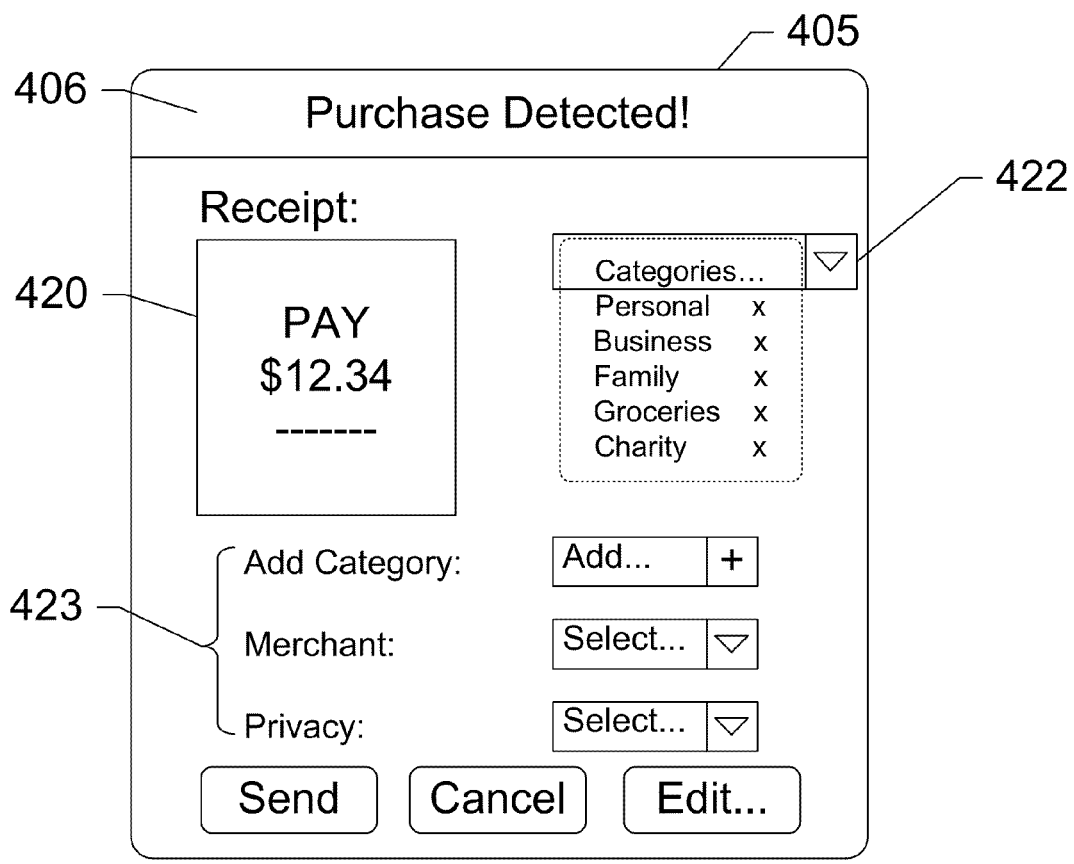
FIG. 4 shows a user interface for generating and categorizing transaction records, according to an example embodiment of the subject disclosure.

FIG. 4 shows a user interface for generating and categorizing transaction records, according to an example embodiment of the subject disclosure. A transaction recording application 406 may be depicted on a display 405 of any device operated by the user, such as the mobile device described herein, a computer, etc. Application 406 may display a "purchase detected" alert, along with an image of receipt 420, a selection of a plurality of categories 422, and additional options 423. Scanned image 420 may be presented to the user on display 405 of the device that received the scanned image from a POS terminal that the user has transacted with, captured the scanned image via an onboard camera, etc. Information on receipt 420 may be extracted via OCR or other means to populate the transaction record. Extracted information may be examined to automatically determine a category 422, a merchant and associated privacy level 423, etc. The transaction record may automatically be categorized based on an association with the merchant, with the privacy level being automatically assigned. Alternatively, the user may customize these attributes, as well as add new attributes. The user may input selections via an input device, such as a keypad, keyboard, etc. Display 405 may be a touch screen allowing the user to activate selections of application 406 simply by touching the area of display 405 showing the respective selection. For instance, the user may tag the transaction record as being "restricted" before sending the transaction record to the server, which would retrieve the "restricted" preference and store the transaction record in the appropriate section of the user's budget online. Although the preferences in this example embodiment are shown in the form of selections 422-423, other means for customizing and categorizing transaction records may be possible via a user interface.

The user may then activate a send button to upload the transaction record, a cancel button to cancel the upload or to exit the application, and an edit button to access more detailed settings, such as communication preferences, merchant addition, etc. Upon activating the send button, the transaction record may be uploaded via any means to a server on a network. Management logic onboard the server may receive the transaction record along with the user's preferences and tags, and accordingly determine in which category to store the record based on the details and attributes of the transaction record, the received preferences, the received tags, etc. The server may also determine, as described above, that certain tags are new, and may appropriately create a new category or layer in the user's profile based on the new tags to store the record.

The transaction record may not be limited to content generated from the transaction. The information may also include application usage data, system information for troubleshooting, cookies, breadcrumbs, call detail records, location-based information, etc. Further, although active and intentional uploading of transaction records has been described, automatic and passive uploading of records may also be possible. For instance, conducting a mobile purchase and/or payment may automatically launch a background process for uploading the transaction record to the user's personal information database. Information within a transaction record may be assigned different levels of privacy, enabling dissemination of particular portions of the record to merchants, developers, and hardware/software manufacturers to improve their services. The user may be able to adjust the frequency, detail level, and privacy level of this automated process. Other automatic processes may include uploading browsing data, shopping data, spending habits, and other details that the user may wish to record but not necessarily disclose to other entities. The user may elect to stop these automated processes at any time, or enable permission for only entities with specific purposes (such as for receiving coupons, rewards, and deals) to have access to this information.

Figure 5:
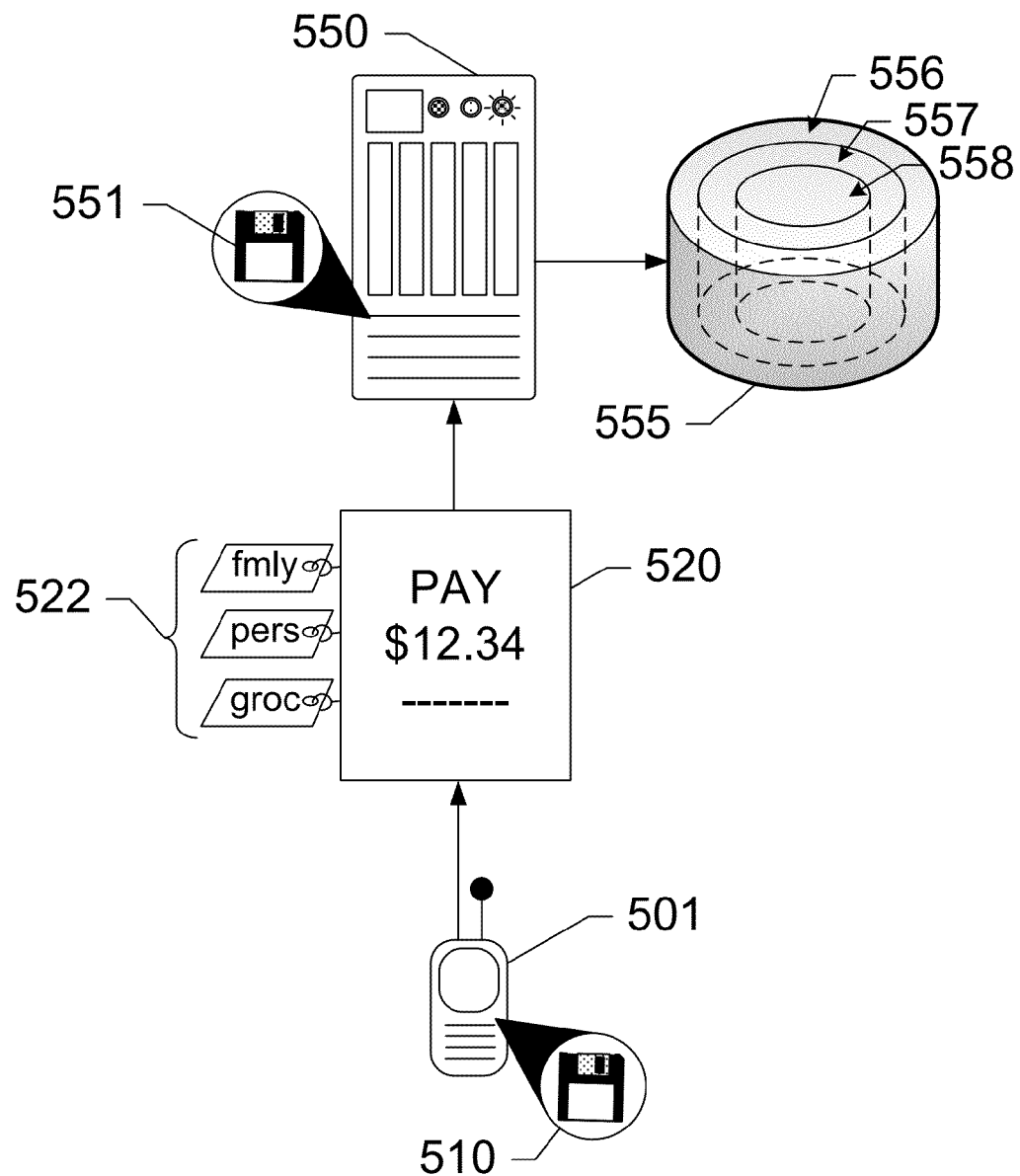
FIG. 5 shows a system for sharing transaction records on a network database, according to an example embodiment of the subject disclosure.

FIG. 5 shows a system for sharing transaction records on a network database, according to an example embodiment of the subject disclosure. The system may include a mobile device 501 having transaction recording logic 510 installed therein, and a server 550 in communication with a personal information database 555. For instance, server 550 may act as an application server hosting a logic 551 for collecting and storing transaction records as described herein, which may be accessible to mobile device 501 via a network (not shown). Logic 551 of server 550 may communicate with mobile device 501 to allow access to personal information database 555, to enable customization of layers 556, 557, and 558 within personal information database 555, and to receive and categorize transaction records, such as transaction record 520, based on tags 522. Setting up the service may include providing a user of mobile device 501 with a default database 555, including basic privacy layers and categories. For instance, database 555 may be represented as a circular or spherical model, with layers of privacy, reminiscent of an onion. The outermost layer 556 may be the most public, with layers 557 and 558 becoming increasingly more restricted and/or secured. Layers 556, 557, and 558 may include categories that may be defined by the user not only as a means for sorting personal information in anticipation of personal recollection, but also in anticipation of receiving requests from other entities for specific information. For instance, an external application, such as a budgeting application, a scheduling application, etc., may request transaction records in a particular category. Such a request may be routed to that category, with any other category being excluded from access by the particular requesting entity.

The user may further be provided with instructions including how to customize the database, upload transaction records, adjust privacy layers and categories, etc. A form may be provided to set up and customize the service, with a possibility of multiple forms, one for each category or type of information item. A user, or in some cases a third party, may upload or provision to database 555 information items including transaction records, pictures, documents, health information, medical records, etc. For instance, logic 510 on mobile device 501 may generate a transaction record including receipt 520 and tags 522, and upload the transaction record to server 550. Tags 522 may include a family tag, a personal tag, and a grocery tag. Logic 551 on server 550 may categorize the transaction record in the appropriate layer of database 555 corresponding to tags 522. Further, logic 551 may determine from the received tags that the transaction record is private, and may determine an appropriate layer of privacy in database 555 to store the transaction record. The user may have specified a merchant before uploading the transaction record, and said merchant may potentially be granted access to all transaction records having matching tags, with any other merchant or entity being denied access to that layer of the user's budget. For instance, an accounting office may be granted access to the user's budget in order to prepare taxes, audits, and other accounting services. Logic 551 may also determine, as described above, that certain tags have not been used before, and may appropriately create a new category or layer to store such records.

The user may further specify trust levels for certain entities. Depending on the level of trust, this may allow these entities to access information within more restricted layers. Examples of trust levels include family, friends, colleagues, clients, and so on. The user may define a privacy layer for each trust level, or may define categories within one or more layers for each trust level. The user may further provide, via server 550 or via any other mechanism, a key or other unique identifier to their closest friends. These friends may attempt to access the user's information or transaction records stored in database 555. A log of requesting entities may be stored on server 550, enabling the user to review such requesting entities at a later time. Logic 551 may further include conversion logic for converting a format of the requested transaction record. The conversion logic may be invoked based on a format requirement of the requesting entity. The format requirement may be necessary for the requesting entity to view the transaction record due to specifications of the device used to request the transaction record.

Figure 6:
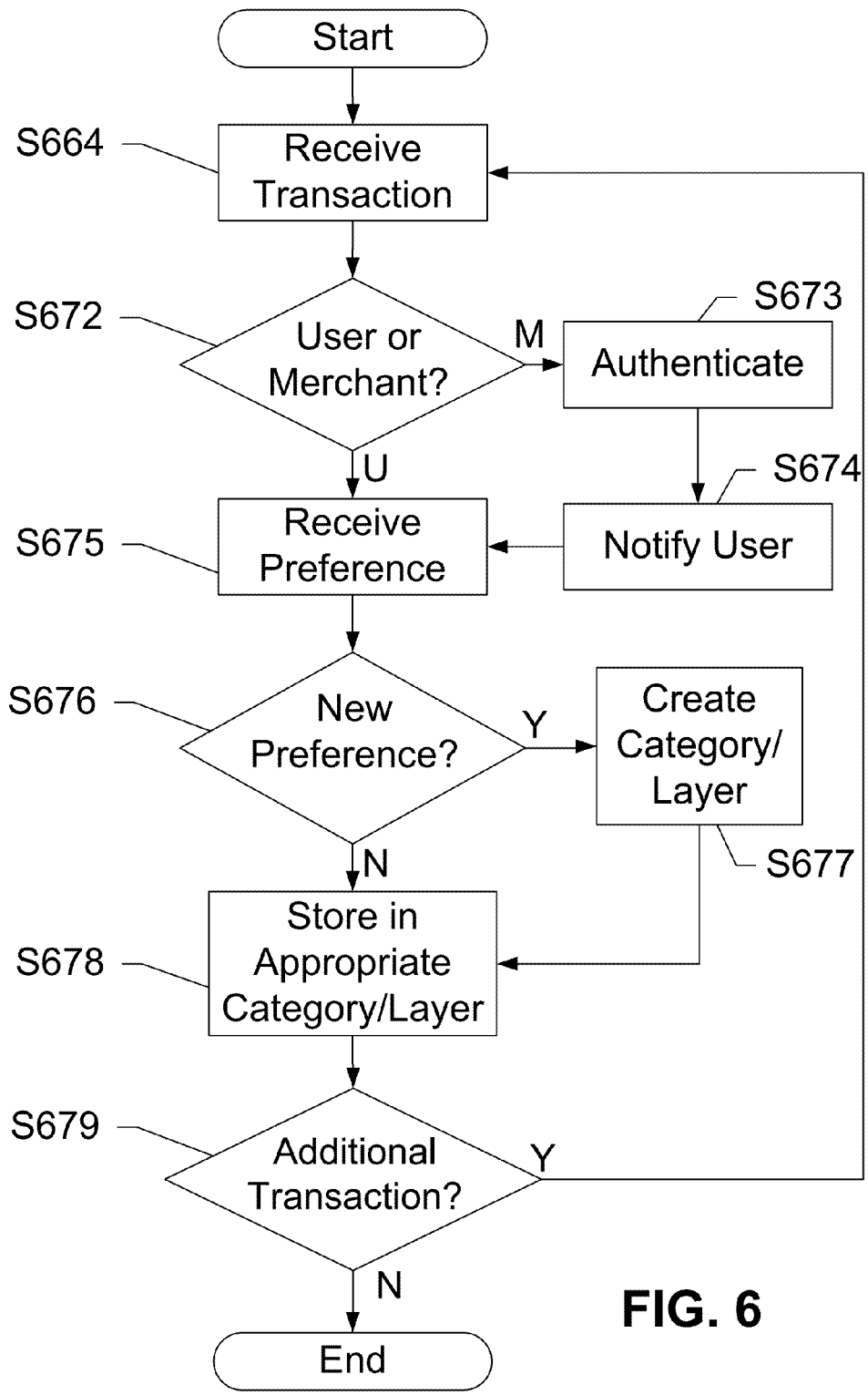
FIG. 6 shows a method for sharing transaction records on a network database, according to an example embodiment of the subject disclosure.

FIG. 6 shows a method for sharing transaction records on a network database, according to an example embodiment of the subject disclosure. This method may be executed among one or more servers on the network in communication with a personal information database storing transaction records associated with a user. The method may begin with a transaction record received from a network device (S664). The transaction record may be received from a mobile device operated by the user. The transaction record may also be received from a POS terminal operated by a merchant. For instance, the server may include logic to track the merchant's sales, either in general or with respect to a particular consumer. In either case a determination is made as to the identity of the entity transmitting the transaction record (S672). If the transaction record is determined to be provided from a merchant or third party, then that party may be authenticated before being allowed access to modify the user's profile (S673). Authentication S673 may include receiving a key or other unique identifier in the request from the merchant or third party, and comparing the key with a table or master set of keys associated with the appropriate privacy layer. The user may be notified that an authenticated entity has provided a new transaction record to be stored in the user's profile (S674). Notification S674 may be in the form of an electronic notification such as an email, text message, etc.

The user may transmit his or her preferences for the transaction record along with the transaction information (S675) or, in the case of a third party upload, upon receiving notification S674. The preferences may include the user's selection of tags, categories, etc. for the transaction record. Other preferences may be provided as disclosed herein, such as a privacy level, trust level, etc. These preferences may be received at the server (S675). A determination may be made as to whether or not the preference is new (S676). A new preference may be one that has not yet been defined in or associated with a category in the user's profile. If the preference is new, a new category or privacy layer may be created in the user's profile (S677). This creation may be as simple as allotting a particular folder or storage space for additional transaction records matching these preferences, or may include creating a new set of fields in a database having new permissions and associated keys for said transaction record. In either case, the received record may be stored in the preferred category or layer (S678). On the other hand, if no preference is defined, then a default category may be used, or an existing category may be deduced from the contents of the transaction record itself. The default category, as well as a default layer, may be specified by the user as being open to merchants, as being completely private until a preference is defined, some combination thereof, etc. The method may then end, unless it is determined that an additional item is to be uploaded (S679), in which case the method may restart, beginning with the server receiving the next transaction record (S664).

Figure 7:
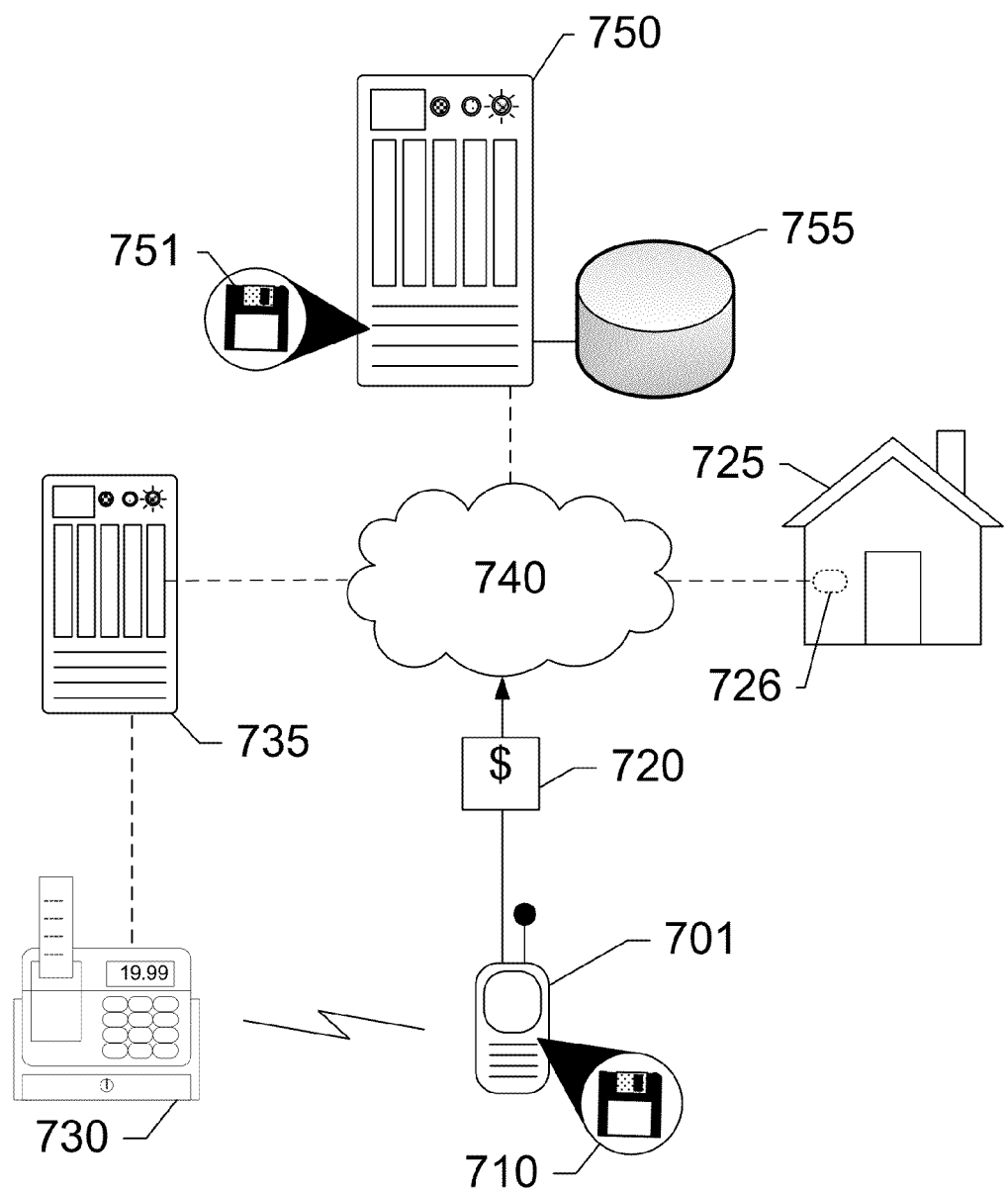
FIG. 7 shows a system for correlating transaction records with an inventory in real-time, according to an example embodiment of the subject disclosure.

FIG. 7 shows a system for correlating transaction records with an inventory in real-time, according to an example embodiment of the subject disclosure. Portions of this system may be similar to those of the system of FIG. 1. For instance, a user operating a mobile device 701 may participate in a transaction with a point of sale terminal 730, resulting in a transaction record 720. Logic 710 on mobile device 701 may include a mobile wallet or mobile payment application to enable a fluid transaction through communication with POS terminal 730. In this case, POS terminal 730 may be further coupled to a merchant server 735. Merchant server 735 may be in communication with a plurality of POS terminals operated by the merchant (not shown). Both mobile device 701 and merchant server 735 may communicate with server 750 across network 740. Server 750 may include logic 751 for receiving, categorizing, and storing transaction records received from either mobile device 701, merchant server 735, etc. Logic 710 on mobile device 701 may present the user with an alert that a receipt 720 has been received from POS terminal 730, and may provide an interface for viewing the receipt, adding details such as category, etc., and saving the resulting transaction record locally or transmitting to server 750 to be processed.

Logic 751 on server 750 may include at least an ability to receive transaction records, such as receipt 720, and an ability to determine a category for the transaction record. The category may be determined based on a plurality of attributes of the transaction record. For instance, a category may include a type of item/service purchased, with the determination being based on an identifier of a merchant or vendor operator of POS terminal 730 printed on receipt 720. Such a category may also be determined by extracting an item description or other information from the transaction record, such as attributes added to the transaction record by logic 710, POS terminal 730, or manually by a user of mobile device 701. These attributes may include, among others, a date and a time of the transaction, a location, payment information, including which bank or credit account was used, user-defined categories (leisure, travel, charity, etc.), etc.

Moreover, an inventory-tracking system 726 incorporated within a building 725 may be in communication with network 740. As briefly mentioned herein, a transaction recording system may communicate with an inventory-tracking system in order to provide inventory-based services to a user. For instance, building 725 may be a home of a user of mobile device 701, and may include a plurality of sensors 726 for taking an inventory of the contents within building 725. Sensors 726 may read an RFID of, scan a barcode for, or optically recognize a specific product. These sensors can be coupled to a refrigerator, a pantry, or other storage units within a home, office, etc. A quantity or availability of products, such as consumables, clothes, food, etc., may be detected through sensors 726 in a closet, laundry room, kitchen, etc. The inventory may be stored in a user profile on database 755, with logic 751 on server 750 identifying each product based on the detected attributes, totaling the products, and offering various services. Server 750 may provide updates and alerts to mobile device 701. Moreover, server 750 may also be in communication with merchant server 735 and receive an inventory of one or more stores that sell the product offered by merchant 735. Server 750 may receive information from merchant server 735 concerning pricing, quantities, special offers, and anything else. Server 750 may also be in communication with one or more databases storing information of each individual product including nutrition facts, expiration date, and even origin information in case of recalls.

Server 750 may further update the inventory stored on database 755 with information retrieved from transaction records 720, including adding newly purchased items to the inventory based on purchases reported by mobile device 710. Such a system enables several services to be offered by server 750, including comparing the inventory with a default inventory list including necessary products, and alerting the user or automatically ordering the products from a store, with expired products being handled similarly. When ordering new products, server 750 may determine which store to buy from based on user-specified preferences, budget, inventory, products needed, information from merchant server 735, etc. Server 750 may search for available coupons on the products needed when determining a store. Merchant server 735 may have its own inventory management and customer tracking to make recommendations and otherwise assist in ordering. Should the store be sold out of a product, merchant server 735 may suggest an alternate product. The user may have specified their own preferences for this scenario so that logic 751 or 710 may reject offers for, for example, non-organic, non-vegan, non-kosher, generic brands, etc. A user's budget constraints, thresholds, etc. as applied to various categories of products, may be retrieved before making recommendations. Multiple homes in a neighborhood or community may link their inventory systems or may communicate with server 750 to order products collectively in bulk. Such a service may be recommended to users who have similar budget constraints and preferences, as defined by the users. Grouping like users together based on similar preferences may enable users within a community to buy cheaper (in bulk), and may allow merchant server 735 to provide group deals and discounts.

Combining a user's budget information, purchase history, inventory, and merchant information may enable users to seamlessly make purchases, go about their regular schedule, and simply wait for deal alerts and recommendations. For example, if the user is hosting a birthday party in two months, and happens to be within half a mile of a great paper plate discount, then logic 710 on the mobile device in conjunction with logic 751 may recognize the need for the paper plates based on the activity, may find the deal, correlate the deal with the user's budget, and may alert the user that an affordable deal is within proximity. The system may further alert the user of a nearby detergent discount when it detects a combination of a discount offered by a merchant and a low quantity of detergent in the user's inventory. If merchant server 735 is provided access to the user's personal information stored in database 755, such as a budget, inventory, schedule, etc., the merchant may submit an instant offer either via server 750 or directly to mobile device 701. For instance, a party store may receive an alert that a user who is hosting a birthday party in two months is nearby. Knowing (with permission) the user's schedule, inventory, budget, and location, the store may calculate a shopping list of products priced to fit the budget and offer them to the user. Moreover, the store may want to give the user an added incentive in the form of a deal, discount, or loyalty rewards for the user.

Figure 8:
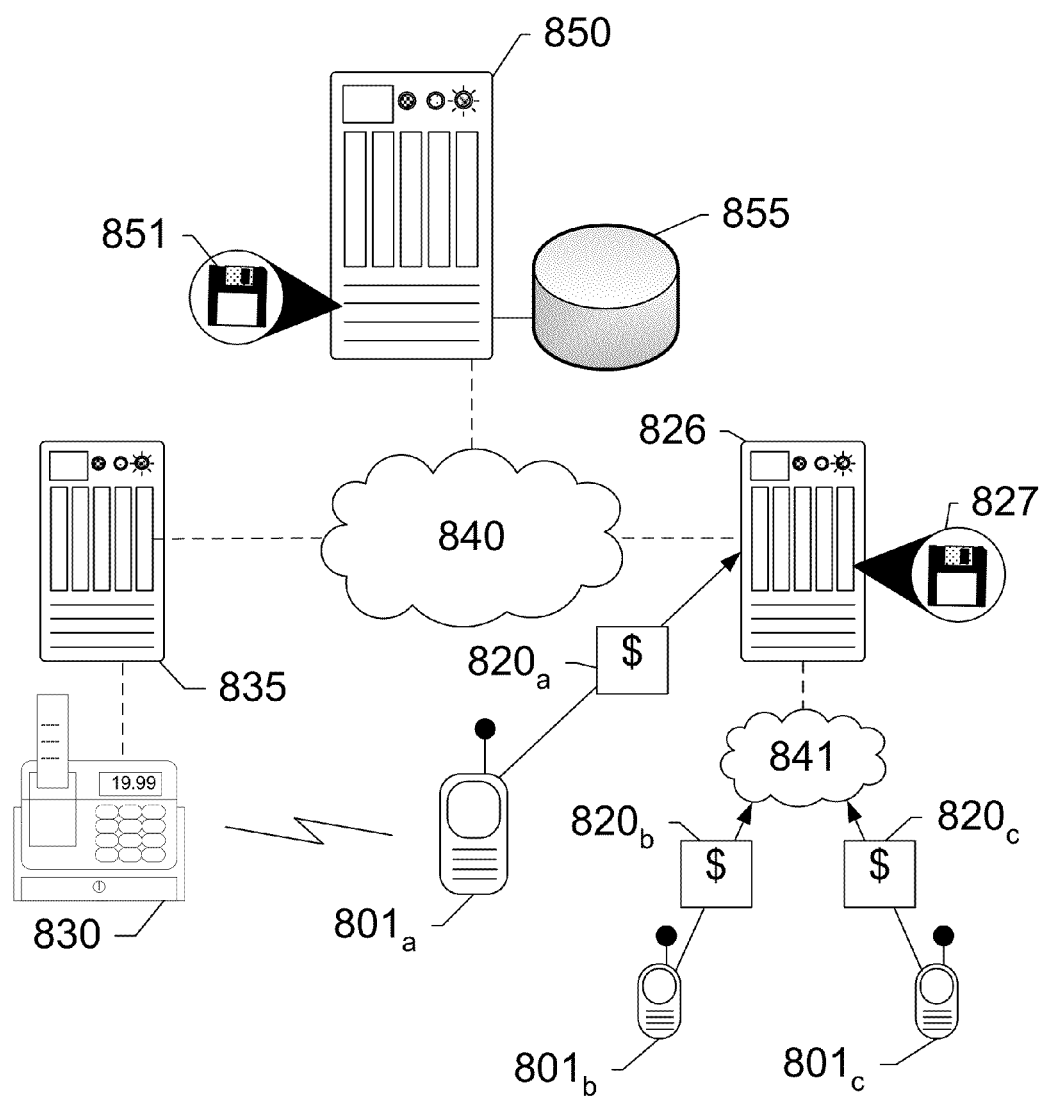
FIG. 8 shows a system for tracking company-wide expenses, according to an example embodiment of the subject disclosure.

FIG. 8 shows a system for tracking company-wide expenses, according to an example embodiment of the subject disclosure. As described in detail herein, mobile device 801$_a$ may participate in a transaction with a point of sale terminal 830, resulting in a transaction record, such as a receipt 820$_a$. POS terminal 830 may be in communication with a merchant server 835 which is further connected to network 840. Network 840 may be any network or combination of networks, including the internet. Network 840 may provide other network elements with access to server 850, which may include logic 851 and database 855 for storing a personal profile for a user. In this embodiment, however, mobile device 801$_a$ is not only associated with a user, but may also be associated with a larger entity representing a collection of users, such as a corporation. The same may apply to mobile devices 801$_b$ and 801$_c$. All of mobile devices 801$_a$, 801$_b$, and 801$_c$ may be in communication with a corporate server 826. Corporate server 826 may be managed by an owner, administrator, employer of users of devices 801$_a$, 801$_b$, and 801$_c$, any combination thereof, etc.

For instance, corporate server 826 may be owned by a business, such as a law firm. Each of mobile devices 801$_a$, 801$_b$, and 801$_c$ may be owned and/or operated by an employee of the law firm. Moreover, corporate server 826 may include logic 827 for communicating with mobile devices 801$_a$, 801$_b$, and 801$_c$, and for receiving transaction records from each mobile device. For instance, a user of mobile device 801$_a$ may have lunch with a client, may pay for the meal by using mobile device 801$_a$ to communicate with POS terminal 830, and may like to be reimbursed for these expenses. The user may receive an electronic receipt or transaction record 820$_a$ from POS terminal 830, or may scan a paper copy of the receipt using a camera on mobile device 801$_a$. In either case, logic onboard mobile device 801$_a$ may submit transaction record 820$_a$ to corporate server 826 using one or more of the several methods described herein. Moreover, other employees/agents of the law firm may be engaged in similar behavior using devices 801$_b$ and 801$_c$ at different locations. Devices 801$_b$ and 801$_c$ may consequently communicate their transaction records 820$_b$ and 820$_c$ via an additional network 841, which may include combinations of networks, such as the internet.

Upon receiving each of records 820$_a$, 820$_b$, and 820$_c$, logic 827 on corporate server 826 may perform tasks including processing the received transaction records. For instance, logic 827 may include at least an ability to receive transaction records 820$_a$, 820$_b$, and 820$_c$, and to determine a category for the transaction records. The category may be determined based on a plurality of attributes of each transaction record. For instance, a category may include a type of item or service purchased, with the determination being based on an identifier of a merchant or vendor operator of POS terminal 830 appearing on the transaction record. Said identifier may have been programmed beforehand, with logic 851 referring to previously stored identifiers to identify a merchant, and therefore, determine a transaction category. Such a category may also be determined by extracting an item description or other information from the transaction record, such as attributes added to the transaction record by the users of mobile devices 801$_a$, 801$_b$, and 801$_c$, respectively. These attributes may include, among others, a date and a time of the transaction, a location, payment information including which bank or credit account was used, user-defined categories (business, travel, charity, etc.), etc. In the case of the law firm, the receipt may be automatically categorized based on the client that the user was entertaining or treating. Consequently, the lunch, and time taken to provide the lunch, may be added to an expense account associated with the client, or stored in a category associated with that client. Scheduling data from each of mobile devices 801$_a$, 801$_b$, and 801$_c$ may be added to determine the time spent during the meal, thereby enabling accurate billing of the client. Further, corporate server 826 may also be in communication with server 850, enabling storage on cloud database 855.

The foregoing disclosure of the example embodiments of the subject disclosure has been presented for purposes of illustration and description. It is not intended to be exhaustive or to limit the subject disclosure to the precise forms disclosed. Many variations and modifications of the embodiments described herein will be apparent to one of ordinary skill in the art in light of the above disclosure. The scope of the subject disclosure is to be defined only by the claims appended hereto, and by their equivalents.

Further, in describing representative embodiments of the subject disclosure, the specification may have presented the method and/or process of the subject disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the subject disclosure should not be limited to the performance of their steps in the order written, and one skilled in the art can readily appreciate that the sequences may be varied and still remain within the spirit and scope of the subject disclosure.

What is claimed is:

1. A server comprising:
 a processor; and
 a memory storing instructions that, when executed by the processor, cause the processor to perform operations comprising:
 providing, to a mobile device associated with a user, a user interface for customizing a personal information database associated with the user, wherein the personal information database comprises a plurality of privacy layers,
 receiving, from the mobile device, via the user interface, a merchant name of a merchant and a first tag associated with the merchant name of the merchant, wherein the first tag indicates a first trust level associated with the merchant,
 receiving, from the mobile device, a transaction record generated as a result of a transaction involving at least one of a product or a service, and further receiving, from the mobile device, a second tag selected by the user, wherein the second tag is associated with the transaction, and wherein the transaction record comprises information about the at least one of the product or the service, determining, based at least in part on the information about the at least one of the product or the service and the second tag associated with the transaction, a privacy layer of the plurality of privacy layers of the personal information database for storing the transaction record, wherein the privacy layer is associated with a permission level, storing the transaction record in the privacy layer of the personal information database associated with the user, determining whether the first trust level associated with the merchant and indicated by the first tag associated with the merchant name of the merchant matches the permission level of the privacy layer determined based at least in part on the second tag associated with the transaction, and in response to determining that the first trust level associated with the merchant and indicated by the first tag associated with the merchant name of the merchant matches the permission level of the privacy layer determined based at least in part on the second tag associated with the transaction, allowing the merchant access to at least a portion of the transaction record, while denying other merchants associated with a second trust level access to the at least a portion of the transaction record.

2. The server of claim 1, wherein the transaction is performed between the mobile device and a point of sale terminal.

3. The server of claim 1, wherein the transaction record comprises an image of a physical receipt associated with the transaction.

4. The server of claim 3, wherein the information about the at least one of the product or the service is extracted from the image of the physical receipt associated with the transaction.

5. The server of claim 1, wherein the transaction record further comprises at least one of a point of sale terminal identifier, a user-defined category, an item amount, a total amount, a location, a time, a date, or a payment method.

6. The server of claim 5, wherein the payment method includes an account identifier.

7. The server of claim 1, wherein the operations further comprise generating and transmitting an alert to the mobile device.

8. The server of claim 7, wherein the personal information database associated with the user comprises a plurality of categories, and wherein the operations further comprise:
determining, based on receipt of the transaction record, whether a threshold associated with activity concerning a combination of categories of the plurality of categories is exceeded; and
in response to determining that the threshold is exceeded, generating and transmitting the alert to the mobile device.

9. The server of claim 1, wherein the operations further comprise transmitting at least one attribute of the transaction record to an inventory management system for updating an inventory of the user.

10. The server of claim 7, wherein the alert is at least one of an offer or a reminder determined by comparing the transaction record with an inventory of the user.

11. The server of claim 7, wherein the alert comprises an offer associated with the merchant having access to the at least a portion of the transaction record.

12. The server of claim 11, wherein the merchant is an accountant, and wherein the offer is for an accounting service.

13. The server of claim 1, wherein the operations further comprise receiving a plurality of transaction records from a corresponding plurality of mobile devices.

14. A non-transitory computer-readable medium storing instructions that, when executed by a processor of a server, cause the processor to perform operations comprising:
providing, to a mobile device associated with a user, a user interface for customizing a personal information database associated with the user, wherein the personal information database comprises a plurality of privacy layers;
receiving, from the mobile device, via the user interface, a merchant name of a merchant and a first tag associated with the merchant name of the merchant, wherein the first tag indicates a first trust level associated with the merchant;
receiving, from the mobile device, a transaction record generated as a result of a transaction involving at least one of a product or a service, and further receiving, from the mobile device, a second tag selected by the user, wherein the second tag is associated with the transaction, and wherein the transaction record comprises information about the at least one of the product or the service;
determining, based at least in part on the information about the at least one of the product or the service and the second tag associated with the transaction, a privacy layer of the plurality of privacy layers of the personal information database for storing the transaction record, wherein the privacy layer is associated with a permission level;
storing the transaction record in the privacy layer of the personal information database associated with the user;
determining whether the first trust level associated with the merchant and indicated by the first tag associated with the merchant name of the merchant matches the permission level of the privacy layer determined based at least in part on the second tag associated with the transaction; and
in response to determining that the first trust level associated with the merchant and indicated by the first tag associated with the merchant name of the merchant matches the permission level of the privacy layer determined based at least in part on the second tag associated with the transaction, allowing the merchant access to at least a portion of the transaction record, while denying other merchants associated with a second trust level access to the at least a portion of the transaction record.

15. A method comprising:
providing, by a server comprising a processor to a mobile device associated with a user, a user interface for customizing a personal information database associated with the user, wherein the personal information database comprises a plurality of privacy layers;
receiving, by the server from the mobile device via the user interface, a merchant name of a merchant and a first tag associated with the merchant name of the merchant, wherein the first tag indicates a first trust level associated with the merchant;
receiving, at the server from the mobile device, a transaction record generated as a result of a transaction involving at least one of a product or a service, and further receiving, at the server from the mobile device, a second tag selected by the user, wherein the second tag is associated with the transaction, and wherein the transaction record comprises information about the at least one of the product or the service;
determining, by the server at least in part from the information about the at least one of the product or the server and the second tag associated with the transaction, a privacy layer of the plurality of privacy layers of the personal information database for storing the transaction record, wherein the privacy layer is associated with a permission level;

storing the transaction record in the privacy layer of the personal information database associated with the user;

determining, by the server, whether the first trust level associated with the merchant and indicated by the first tag associated with the merchant name of the merchant matches the permission level of the privacy layer determined based at least in part on the second tag associated with the transaction; and in response to determining that the first trust level associated with the merchant and indicated by the first tag associated with the merchant name of the merchant matches the permission level of the privacy layer determined based at least in part on the second tag associated with the transaction, allowing, by the server, the merchant access to at least a portion of the transaction record, while denying other merchants associated with a second trust level access to the at least a portion of the transaction record.

16. The method of claim 15, wherein the information about the at least one of the product or the service is extracted from an image of a physical receipt associated with the transaction.

17. The method of claim 15, wherein the transaction is performed between the mobile device and a point of sale terminal.

18. The method of claim 15, wherein the personal information database associated with the user comprises a plurality of categories, and wherein the method further comprises:

determining, based on receipt of the transaction record, whether a threshold associated with activity concerning a combination of categories of the plurality of categories is exceeded; and in response to determining that the threshold is exceeded, generating and transmitting an alert to the mobile device.

19. The method of claim 15, wherein the transaction record further comprises at least one of a point of sale terminal identifier, a user-defined category, an item amount, a total amount, a location, a time, a date, or a payment method.

20. The method of claim 19, wherein the user-defined category is received from the user via an interface provided by the mobile device.

* * * * *